United States Patent Office 3,465,862
Patented Sept. 9, 1969

3,465,862
STATIONARY COIL ELECTROMAGNETIC CLUTCH OR BRAKE
Fred R. Birdsall, Sayre, Pa., assignor to The Bendix Corporation, a corporation of Delaware
Continuation-in-part of application Ser. No. 587,106, Oct. 17, 1966. This application Apr. 15, 1968, Ser. No. 725,252
Int. Cl. F16d *37/02;* F16c *27/00*
U.S. Cl. 192—84                            4 Claims

ABSTRACT OF THE DISCLOSURE

An electromagnetic clutch or brake having a stationary electromagnetic coil in which flux transfer between the stationary magnet body and the rotary components only occurs in a substantially axial direction. By providing large area flux transfer means at either side of the electromagnetic coil, flux is allowed to transfer from stationary to rotary components without experiencing the losses normally associated with stationary coil electromagnetic clutches or brakes.

REFERENCE

This application is a continuation-in-part of my co-pending, commonly-assigned application Ser. No. 587,-106, filed Oct. 17, 1966, and now abandoned.

SUMMARY OF INVENTION

The known stationary coil electromagnetic clutches or brakes suffer from a pair of maladies which go hand in hand. Flux transfer between the stationary and rotary components has been accomplished by having the flux move in a generally radial direction. This has appeared to allow a saving in size. In order to minimize flux losses at these interfaces, the gaps between the components have been kept small with very close tolerances required in the manufacture. These requirements have greatly increased the cost of known stationary coil electromagnetic clutches and brakes and have also given rise to device failures arising from bearing tilt problems and to instances of reduced torque transmitting and absorbing abilities where gaps have been maintained large to counter the bearing tilt.

It is an object of the present invention to provide an stationary field electromagnetic clutch or brake having significantly-higher torque capacity than known clutches and brakes of like external dimensions.

It is an object of the present invention to provide an electromagnetic clutch or brake having an unusually efficient magnetic circuit design to signficantly reduce power losses from hysteresis effects and saturation effects.

It is an object of the present invention to provide an electromagnetic cluch or brake of the stationary field type having a low loss of electromagnetic energy resulting from flux transfer from the rotatable to the non-rotatable members of the clutch or brake.

It is an object of the present invention to provide an electromagnetic clutch or brake which has a large transfer area for magnetic flux for a given external clutch or brake size.

It is an object of the present invention to provide an electromagnetic clutch or brake which can be made primarily from punch press parts not requiring expensive machining operations.

It is an object of the present invention to provide an electromagnetic clutch or brake having open and non-critical radial tolerance requirements as compared to known clutches and brakes.

It is an object of the present invention to provide an electromagnetic clutch or brake which is not subject to the manufacturing and use problems which arise from the inevitable lack of parallelism and concentricity and the inevitable eccentricities which plaque known electromagnetic clutches or brakes.

It is a further object of the present invention to provide a stationary field electromagnetic clutch or brake in which the magnetic flux must cross gaps which are substantially axial.

It is a further object of the present invention to provide a construction for an electromagnetic clutch or brake which is simpler, less expensive, easier to manufacture and assemble, and has higher torque capacity than known electromagnetic clutches or brakes, especially stationary field type clutches or brakes.

It is a still further object of the present invention to provide an electromagnetic clutch or brake of the stationary field type which has a more efficient and less expensive coil design than known clutches or brakes of similar torque capacity.

It is a still further object of the present invention to provide an electromagnetic clutch or brake which requires less flux conducting material by weight (and cost) than known clutches and brakes of similar capacity.

It is a still further object of the present invention to provide an electromagnetic clutch or brake which may readily employ plastic-type, planar-bearing structure to permit relative rotation between the stationary housing and the rotatable members.

It is a still further object of the present invention to provide an electromagnetic clutch or brake which may be assembled by pressing and crimping of parts and which does not require any welding of parts.

DETAILED DESCRIPTION OF THE DRAWING

Figure 1:
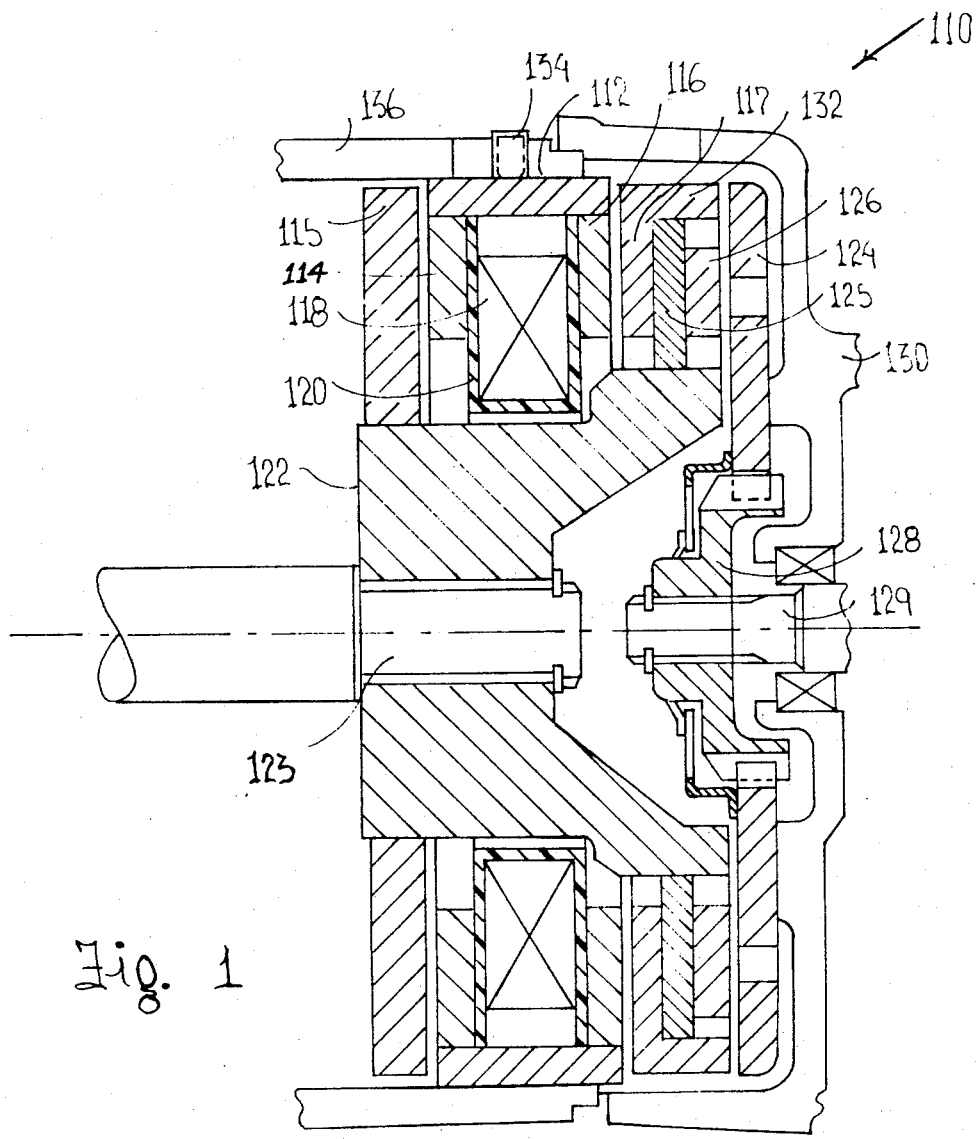
FIGURE 1 shows, in a partly broken-away section view, one embodiment of an electromagnetic clutch or brake according to the present invention.

Referring now to FIGURE 1, the numeral 110 designates a preferred embodiment of a stationary coil electromagnetic clutch or brake according to the present invention. The device 110 has a generally-cylindrical housing 112 which includes radially-extending, disc-like flanges 114 and 116. Retained within the housing 112 is the electromagnetic coil 118, here shown with plastic bobbin 120. The man skilled in the art will recognize that, alternatively, the coil could be directly wound within the housing 112, thereby eliminating the bobbin 120.

Axially displaced from each flange 114 and 116 are complementary flanges 115 and 117 which are connected by any convenient means to shaft 122 for rotation therewith. Flange 115 is directly connected to the shaft member 122, while flange 117 is attached to a disc of non-flux conducting material 125 which is, however, connected to the shaft member 122. The complementary pairs of flanges 114, 115 and 116, 117 form flux transfer means at either side of the electromagnetic coil 118. Since the flanges 115 and 117 form radially-extending rotary shaft portions at either side of the coil 118, the forces caused by the flux crossing the gaps between stationary and rotary elements of the flux transfer pairs tend to offset each other so that force imbalance on the housing and on the shaft member 122 is minimized, thereby greatly reducing the bearing tilt problem.

Axially displaced from the armature contactive surface at the end of the shaft member 122 is an axially-movable armature 124 which is slidable so as to move into contact with the end of the shaft member 122 adapted for that purpose. This surface also includes the axially-extending portion 132 of flange 117 and the permeable ring 126. In this embodiment, additional electromagnetic force is generated between the shaft member 122 and armature 124 by forcing the flux path to leave the armature and cross over to a permeable ring 126 and then to return to the armature. This is a well-known expedient and need not be further discussed. The armature is splined for connection to a second shaft member 128 which may be connected to an input or output shaft as at 129 by conventional means or it may itself be an input or output shaft. The second shaft member 128 may also be fixedly attached to the housing 130 to provide the braking function.

In this embodiment, the flux path includes the cylindrical housing 112, the flux transfer pairs 114, 115 and 116, 117, the shaft member 122, the armature 124 and the permeable ring 126. Each time the flux crosses a non-permeable gap, such as between the flux transfer pairs and between the armature and the axially-extending portion 132 of the shaft-connected flange 117, the permeable ring 126 and the shaft member 122, the direction of travel is substantially axial. Furthermore, once the armature 124 is in contact with the shaft member 122, the remaining gaps at the flux transfer pairs having large transfer areas which allow flux concentration to be reduced, thereby decreasing looses at the gaps.

For ease of adjustment, central housing 112 can be positioned relative to the shaft-connected flanges 115 and 117 by loosening set screws in the housing portion 136, one of which is shown at 134. This allows easy setting of the gaps between the flux transfer pairs as a final adjustment once the clutch or brake has been mated with associated machinery.

The shaft member 122 is connected to an input or output shaft such as shaft 123 by any convenient conventional means or it may itself be the input or output for the device.

Figure 2:
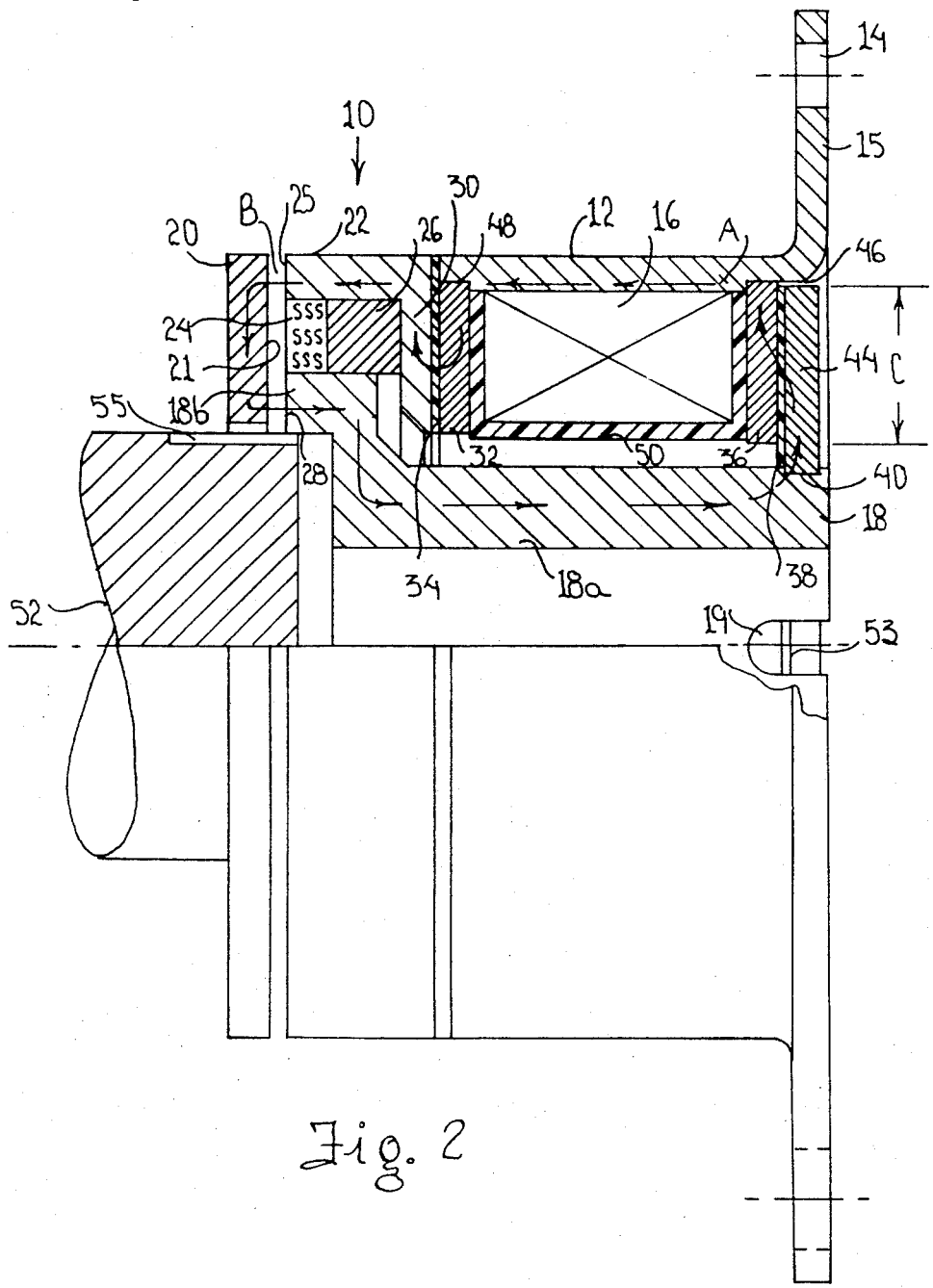
FIGURE 2 shows a second embodiment of the present invention in which plastic-type washers have been inserted between the rotary and stationary device components.

Turning now to FIGURE 2, numeral 10 shows generally an electromagnetic clutch or brake having a stationary cylindrical housing 12 with a radially-outwardly-extending flange or lip portion 15 for connection through the securing holes 14 provided in the flange 15 to supporting structures such as, for example, a frame or body.

An electromagnetic coil of wires 16 is fixedly connected to the inner portion of the housing 12, in part by a non-magnetic bobbin or plotting compound 50. A rotatable sleeve shaft member 18 has an axially-extending portion 18a which is radially inwardly of the coil 16 and has a radially-outwardly-extending annular flange portion 18b, which extends axially beyond the axial shaft portion 18a. A pilot slot 19 is formed in the shaft member 18 to receive a pin member 53 to provide a connection for receiving an external shaft, not shown.

An annular armature plate or disc member 20 is connected to an external shaft member 52 by splines 55. The armature member 20 is axially movable toward and away from the shaft member 18. Thus surface 21 of the armature member, adjacent flange portion 18b of the shaft 18, has a friction surface designed to generate a known friction when in contact with the other confronting portion of the clutch assembly, shown generally by the numeral 25. It is noted that a toothed connection, rather than friction connection, may also be used. The assembly generally shown by the numeral 25 includes an annular cylinder-like member 22 having a radially-inwardly-extending flange, or first annular metal disc member 30. A ring 26 of a non-flux conducting material mechanically interconnects the two portions which form the magnet plate member comprising shaft portion 18b and annular member 22. A friction material 24 is added to the space existing between the members 18b and 22 or the surface 28 of the combined assembly.

A plurality of inner circumferential pilot slots or rings 46 and 48 are formed in the housing member 12 on either side of and in close proximity to the coil 16. An additional circumferential ring or slot 40 is formed in the axially-extending portion 18a of the shaft 18 on its outer surface and designed to be axially spaced on the flange 15 side of the slot 46, formed in the housing when the clutch is assembled.

A first annular radially-extending planar bearing disc or ring 34 of a low friction bearing material, preferably a synthetic plastic-type material, but may also be bronze or the like, is disposed between the radial flange 30, a portion of the housing 12 and a second annular metal disc 32 which is fitted into the pilot slot 48 and fixed therein. The bearing ring 34 may have a flux conducting material such as iron filings dispersed in it.

A connecting structure comprises a third annular metal disc or ring 36, a second annular radially-extending, planar-bearing member 38 of material similar to disc 34 and a fourth annular metal disc or ring 44 is disposed on the other side of coil 16. The third disc 36 is fitted into the groove 46 formed in the housing 12, and the fourth disc 44 is fitted into the groove 40 formed in the shaft portion 18a. The discs 36 and 44 sandwich the bearing member 38.

This structure, shown and described, permits relatively-low friction between the rotating shaft 18 and the stationary housing 12. The assembly needs no welding or riveting as the parts may be press-fitted together. Most of the parts may be punch press manufactured and essentially, no expensive machining is required. Because there are no axial air gaps other than between armature 20 and magnet plate member, that is, those having an axial dimension of significance. The bearing tilt problem associated with stationary coil clutches is solved. In addition, the absence of axial air gaps eliminates the high tolerance requirements to maintain accurate concentricity. Assembly, disassembly and servicing of the clutch is simple and inexpensive. Parts may be replaced more economically than thought possible in known clutch assemblies.

A major construction of the invention is its increased torque capability as a function of size, weight and cost. This major functional breakthrough can be understood by examining the flux path of the magnetic flux generated by the coil 16. Commencing at the point A, the flux flows axially through the housing 12, annular ring 32, through the bearing 34, radial plate 30 and axially through the cylinder-like member 22 which forms a portion of the magnet plate assembly. The flux then jumps across the axial air gap B and flows radially through the annular disc armature member 20, and recrosses the air gap B into the radially extending portion 18b of the shaft member 18. The flux travels through the shaft portion 18a of the shaft member 18, and then radially through a portion of the annular disc member 44. The flux then crosses through the radial bearing member 38 to the disc member 36 and thence back to the housing member 12 and to point A.

The area of radial overlap or mutual extent of the disc members 36 and 44, shown by the letter C, is relatively-large as compared to other clutch dimensions. The same is true of the overlap of disc members 30 and 32. The large transfer area provided by this invention insures that saturation and hysteresis losses will be much smaller than in other clutch designs of equivalent external dimensions, weight and cost. In addition, this design permits the coil 16 to be wound on a smaller average radius, thus reducing the cost and weight of the coil for a given amount of flux. Still further, the reduced radius of coil allows either a smaller size coil wire to be used, since coil resistance is directly proportional to coil wire length and inversely proportional to coil wire diameter for a given flux level or provides a greater flux level for a given coil wire diameter and length. Thus, the present invention permits the utilization of a significantly more efficient coil design.

Still further, the present invention requires less flux conducting metal, usually steel, since the transfer area design is more efficient than known clutches. The clutch of the present invention eliminates the trepanning operation usually required to provide a space for the coil. The disc members 32, 36 and 44 and the shaft 18 are operative to secure the coil 16 within the housing 12. Still further, all manufacturing tolerances may be larger than formerly believed possible in electromagnetic clutch design, primarily because of the elimination of the axially-extending, non-working air gap which required highly accurate dimensions which were difficult to achieve without extensive and expensive machinery and inspection.

In this connection, it will be noted that during clutch assembly, bearings 34 and 38 operate as spacing shims, establishing a known spacing based on physical thickness.

It can be easily appreciated that the present invention accomplishes its stated objects. Tests have shown that clutches of this design are able to produce up to 1½ times the torque capacity of clutches of previously-known types at no greater cost or weight and with smaller external dimensions. Because of the increased efficiency of the magnetic flux circuit design of this clutch, it is a highly desirable clutch wherever low cost, weight and small physical dimensions are important.

I claim:
1. An electromagnetic clutch or brake comprising:
an axially movable armature member;
a shaft means having a contactive surface axially spaced from said armature member for selective engagement therewith on axial movement of said armature;
said shaft means having an axially-extending portion extending away from said armature member;
stationary housing means concentrically disposed radially outwardly of said axially-extending portion of said shaft means;
electromagnetic coil means for generating electromagnetic flux fixedly connected to said stationary housing means radially intermediate said housing means and said axially-extending portion of said shaft means and axially displaced from one end of said shaft means;
flux transfer means at either side of said electromagnetic coil means providing a large annular radially-disposed flux transfer area at each coil end so that the direction of flux transfer is substantially axial;
said flux transfer means comprising at least one pair of radially-extending annular electromagnetic flux conducting discs, one of each of said pairs of discs being fixedly connected to said stationary housing means and the other of said pairs of discs being fixedly connected to said shaft member; and
an annular radially-disposed planar bearing disc member intermediate the discs of each of said pairs of discs;
said bearing disc member including flux conducting material dispersed therein; and
said flux transfer means providing an electromagnetic flux interconnection between said stationary housing means and said shaft means.

2. An electromagnetic clutch or brake comprising:
a stationary housing means;
electromagnetic coil means adapted to be fixedly connected to said stationary housing means;
stationary flux transfer means at either side of said electromagnetic coil means and extending radially from said stationary housing means;
said shaft means generally concentric with said electromagnetic coil means;
said shaft means including radially-extending first and second flux transfer means axially spaced from said stationary flux transfer means and generally radially co-extensive with said stationary flux transfer means;
said shaft means having an armature contactive surface;
axially-movable armature means displaced from said surface and movable into torque exchanging contact therewith under the influence of current flow in said electromagnetic coil means;
said first flux transfer means comprising an annular flux conducting member having a radially-extending portion confronting one of said stationary flux transfer means and an axially-extending portion supported by an annular ring of non-flux conducting material which includes a friction material and which mechanically interconnects the first flux transfer means and the shaft means; and
said armature contactive surface of said shaft means and said friction material and said axially-extending portion of said first flux transfer means forming a common surface for torque exchanging contact with said armature means.

3. The device as claimed in claim 2 wherein:
said bearing means are plastic impregnated with a flux conducting material.

4. An electromagnetic clutch or brake comprising:
an axially-movable armature member;
a shaft member having one end axially spaced from said armature member for selective contactive engagement therewith on axial movement of said armature;
said shaft member having an axially-extending portion extending away from said armature member;
stationary housing means concentrically disposed radially outwardly of said axially-extending portion of said shaft member;
coil means for generating magnetic flux fixedly connected to said housing means radially intermediate said housing means and said axially-extending portion and axially intermediate the ends of said axially-extending portion;
a pair of combined radial bearing and flux transfer connecting means, one disposed at each coil side, rotationally connecting said annular extending member to said housing means, while providing a large annular radially disposed flux transfer area on each coil side;
each of said combined radial bearing and flux transfer means comprising a pair of parallel radially-extending annular metal discs, and an annular radially-disposed planar bearing disc member intermediate said pair of parallel annular metal discs to provide a bearing connection with large annular flux transfer area; and
one of said parallel annular metal discs being fixedly connected to said stationary housing means and the other being fixedly connected to said shaft member, said planar bearing disc member being a synthetic low friction plastic material having flux conducting material dispersed therein;
said pair of parallel annular metal discs and said planar bearing disc member are in contactive engagement, thereby avoiding spaced axial air gaps, while providing a large flux transfer area.

References Cited

UNITED STATES PATENTS

| 747,706 | 12/1903 | Hewlett. |
| 2,899,036 | 8/1959 | Ryba. |
| 2,976,093 | 3/1961 | Reiling _____ 308—238 |
| 3,233,710 | 2/1966 | Daniels. |

FOREIGN PATENTS

| 16,766 | 8/1908 | Great Britain. |

BENJAMIN W. WYCHE III, Primary Examiner

U.S. Cl. X.R.

188—163; 308—238